US012755295B2

(12) United States Patent
Narasimha et al.

(10) Patent No.: US 12,755,295 B2
(45) Date of Patent: Oct. 6, 2026

(54) PREDICTING CUSTOMER CHURN FROM MULTI-PRODUCT DATA

(71) Applicant: Freshworks Inc., San Mateo, CA (US)

(72) Inventors: Srivatsa Narasimha, Bangalore (IN); Chetan Bhat, Bangalore (IN); Sai Charan Rapolu, Hyderabad (IN); Swaminathan Padmanabhan, Chennai (IN)

(73) Assignee: Freshworks Inc., San Mateo, CA (US)

( * ) Notice: Subject to any disclaimer, the term of this patent is extended or adjusted under 35 U.S.C. 154(b) by 343 days.

(21) Appl. No.: 18/325,330

(22) Filed: May 30, 2023

(65) Prior Publication Data

US 2024/0403903 A1 Dec. 5, 2024

(51) Int. Cl.
*G06Q 30/0202* (2023.01)

(52) U.S. Cl.
CPC ................................ *G06Q 30/0202* (2013.01)

(58) Field of Classification Search
CPC ................................................ G06Q 30/0202
See application file for complete search history.

(56) References Cited

U.S. PATENT DOCUMENTS

| | | | | |
|---|---|---|---|---|
| 11,863,641 B1 * | 1/2024 | Schlerf | G06F 16/954 | |
| 2005/0097028 A1 * | 5/2005 | Watanabe | G06Q 40/02 | 705/37 |
| 2008/0162268 A1 * | 7/2008 | Gilbert | G06Q 10/06375 | 705/7.29 |
| 2010/0223099 A1 * | 9/2010 | Johnson | G06Q 30/0243 | 705/14.42 |
| 2011/0016058 A1 * | 1/2011 | Pinchuk | G06Q 30/02 | 705/348 |
| 2011/0066938 A1 * | 3/2011 | Nageswaram | G06Q 10/107 | 715/848 |
| 2017/0039233 A1 * | 2/2017 | Gauthier | G06F 3/0482 | |
| 2017/0061343 A1 * | 3/2017 | Han | G06Q 10/067 | |
| 2017/0091810 A1 * | 3/2017 | McGovern | G06Q 30/0247 | |
| 2017/0236087 A1 * | 8/2017 | Williams | G06Q 10/06375 | 705/7.37 |
| 2018/0018684 A1 * | 1/2018 | Orr | G06Q 30/0202 | |
| 2020/0120003 A1 * | 4/2020 | Sridhar | H04L 41/5064 | |
| 2024/0089224 A1 * | 3/2024 | Vadlamani | H04L 51/56 | |

(Continued)

OTHER PUBLICATIONS

Allan, et al., "Harmonising Chorales by Probabalistic Inference", Advances in Neural Information Processing Systems 17 (NIPS 2004), MIT Press, pp. 25-32.

(Continued)

*Primary Examiner* — Rutao Wu
(74) *Attorney, Agent, or Firm* — LeonardPatel PC; Sheetal S. Patel; Michael A. Leonard, II

(57) ABSTRACT

Predicting churn from a multi-product data using sequential modeling includes collecting, by a journey module, data from a plurality of platforms to build a journey defined by one or more events, and creating, by a sequential deep learning (DL) model, relationship data identifying between events in a chronological order, capturing temporal dependencies present in the data. This also includes correlating, by a churn prediction module, sequences of events to a churn event, and identifying when the churn event is going to occur based on pattern learnt to differentiate between "churn" and "non-churn" journeys.

20 Claims, 9 Drawing Sheets

(56) References Cited

U.S. PATENT DOCUMENTS

2026/0154620 A1* 6/2026 Wang .................... G06N 3/098

OTHER PUBLICATIONS

Arjovsky, et al., "Unitary Evolution Recurrent Neural Networks", ICML, 2016.

Ba, et al., "Layer Normalization", arXiv:1607.06450, 2016.

Bahdanau, et al., "Neural Machine Translation by Jointly Learning to Align and Translate", ICLR, 2015.

Bengio, et al., "Learning Long Term Dependencies with Gradient Descent is Difficult", IEEE Transactions on Neural Networks, vol. 5, No. 2, Mar. 1994.

Bottou, et al., "Experiments with Time Delay Networks and Dynamic Time Warping for Speaker Independent Isolated Digits Recognition", First European Conference on Speech Communication and Technology, EUROSPEECH '89, Paris, France, Sep. 27-29, 1989.

Boulanger Lewandowski, et al., "Modeling Temporal Dependencies in High-Dimensional Sequences: Application to Polyphonic Music Generation and Transcription", arXiv:1206.6392, 2012.

Bradbury, et al., "Quasi-Recurrent Neural Networks", ICLR, 2017.

Campos, et al., "Skip RNN: Learning to Skip State Updates in Recurrent Neural Networks", ICLR 2018.

Chang, et al., "Dilated Recurrent Neural Networks", NIPS, 2017.

Cho, et al., "On the Properties of Neural Machine Translation: Encoder-Decoder Approaches", arXiv:1409.1259, 2014.

Chung, et al., "Empirical Evaluation of Gated Recurrent Neural Networks on Sequence Modeling", arXiv:1412.3555, 2014.

Chung, et al., "Hierarchical Multiscale Recurrent Neural Networks", arXiv:1609.01704, 2016.

Collobert, et al., "A Unified Architecture for Natural Language Processing: Deep Neural Networks with Multitask Learning", ICML, 2008.

Collobert, et al., "Natural Language Processing (Almost) From Scratch", JMLR, 12, 2011.

* cited by examiner

200

500

| | Freshsales in-product usage | | +Freshdesk tickets | +Freshchat sessions | +Emails and chat | +Voice & Pre/post conversion data from Freshsales |
|---|---|---|---|---|---|---|
| For all accounts in testing | 68% | 73% | 75% | 75.6% (AUC 77.4% → 77.7%) | 78% (AUC 77.7% → 78.6%) | Future scope |
| For accounts >15 months of product usage | 68% | 80% | 83% | 84.1% (AUC 82.4% → 83.6%) | 85.4% (AUC 82.9% → 84%) | |

600

700

900

PREDICTING CUSTOMER CHURN FROM MULTI-PRODUCT DATA

FIELD

The present invention relates to predicting customer churn, and more particularly, to predicting customer churn from multi-product data using sequential deep learning (DL) modeling.

BACKGROUND

Churn is a metric that refers to customer turnover. Churn happens when a customer decides to stop using a product or service. The more customer churning that takes place, the more customers are leaving the business for a competitor. Thus, it is beneficial to build a machine learning model (or a churn model) that identifies when a customer may churn.

However, there are two major challenges-building a churn model and building a deep learning sequential model.

Building a Churn Model

To build a churn model, a customer journey is created by taking into account multi-product data of a customer. This may include product usage, interactions through various channels, such as email, messages and voice messages, and customer attributes. Customer attributes include country, city, employee size, customer revenue size and industry.

Also, to build a churn model, events or activities early in the customer journey across different products must be considered. This may include trying to identify expressing desire for a particular feature earlier might be a cause for churn now.

Building a Deep Learning Sequential Model

Current churn models consume the data (e.g., events leading to churn). This may include activity counts, customer attributes, chat messages, sales emails and tickets in a non-sequential manner. Additionally, current churn models may also dilute the context of the customer journey because events are related to each other and there might be many reasons as to why one event happened after another. Further, it may be difficult to model sequential event usage patterns in software as a service (SaaS) for an account using classical machine learning (ML) models, since accounts are multi-agent systems where each agent exhibits different usage behaviors. Lastly, early churn detections are hard to accomplish with classical ML models.

Classical ML models, such as decision trees, support vector machines, and random forests, are primarily designed for static and independent data sets. These models generally make predictions based on a fixed set of input features without taking into account the temporal dependencies or the order of the data points. Classical ML models do not build relationships between the feature vectors across different timestamps of a customer journey. Hence, patterns embedded in the initial feature vectors cannot be effectively correlated to a churn event.

Most existing churn modeling systems are siloed in their approach, i.e., the systems do not consume data from different sources to get better context for a churn and non-churn event. Also, in the domain of sales, there is little to no work done on developing a sequence based churn model. Our invention focuses on developing a churn model which connects the events sequentially and also takes in data from different sources. Our method ensures that the model learns a holistic view of the customer's journey by looking at the actions of the customer across different products and links these actions through a sequence to accurately predict churn.

Thus, an improved technique to predict customer churn from multi-product data using sequential DL modeling may be beneficial.

SUMMARY

Certain embodiments of the present invention may provide solutions to the problems and needs in the art that have not yet been fully identified, appreciated, or solved by current churn modeling technologies. For example, some embodiments of the present invention pertain to predicting customer churn from multi-product data using sequential modeling.

In an embodiment, a computer-implemented method for predicting churn from a multi-product data using sequential modeling includes collecting, by a journey module, data from a plurality of platforms to build a journey defined by one or more events. The method also includes creating, by a DL model, relationship data identifying between events in a chronological order, capturing temporal dependencies present in the data. The method further includes correlating, by a churn prediction module, sequences of events to a churn event, and identifying when the churn event is going to occur based on pattern learnt to differentiate between "churn" and "non-churn" journeys.

In another embodiment, a system includes memory comprising a set of instructions and at least one processor. The set of instructions are configured to cause the at least one processor to execute collecting, by a journey module, data from a plurality of platforms to build a journey defined by one or more events. The set of instructions are further configured to cause the at least one processor to execute creating, by a DL model, relationship data identifying between events in a chronological order, capturing temporal dependencies present in the data. The set of instructions are further configured to cause the at least one processor to execute correlating, by a churn prediction module, sequences of events to a churn event, and identifying when the churn event is going to occur based on pattern learnt to differentiate between "churn" and "non-churn" journeys.

In yet another embodiment, a non-transitory computer-readable medium comprising a computer program, the computer program causing at least one processor to execute collecting, by a journey module, data from a plurality of platforms to build a journey defined by one or more events. The computer program further causing at least one processor to execute creating, by a DL, relationship data identifying between events in a chronological order, capturing temporal dependencies present in the data. The computer program further causing at least one processor to execute correlating, by a churn prediction module, sequences of events to a churn event, and identifying when the churn event is going to occur based on pattern learnt to differentiate between "churn" and "non-churn" journeys.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to predicting customer churn from multi-product data using sequential modeling.

Let's consider Freshsales® as a use case, in which a particular Freshworks® user performs activities across different product platforms. The user (or entity) may create leads and/or deals on Freshsales® for their customers. If the customer find an issue, the customer may raise one or more tickets on Freshdesk® or talk to a Freshworks® agents through Freshchat®, for example.

If the data available from one product were used to build context for a particular customer, there may not be sufficient data to generate a complete picture of the current state of the customer's journey.

Current churn prediction models in different products focus only on the information available from a particular product. For example, a churn production model for Freshdesk® is built using the information available from the one or more tickets. The churn prediction model for Freshsales® is built solely using the attributes from the Freshsales® product. The problem with this isolated approach is that any system that is built to predict churn does not have a holistic view of the customer journey, i.e., the various events that might have happened which affect churn.

Furthermore, the Freshsales® churn prediction model does not have access to the tickets raised by the customer in Freshdesk® just before the customer churned, which might bring in relevant context as to why the churn event happened. Likewise, the Freshdesk® churn prediction model does not have access to the Freshchat® messages or the activities in Freshsales® to accurately predict churn for the particular customer. The bottom line is that there is no bird's eye view of the customer journey that the model can learn for which results in building better context for churn.

Figure 1:
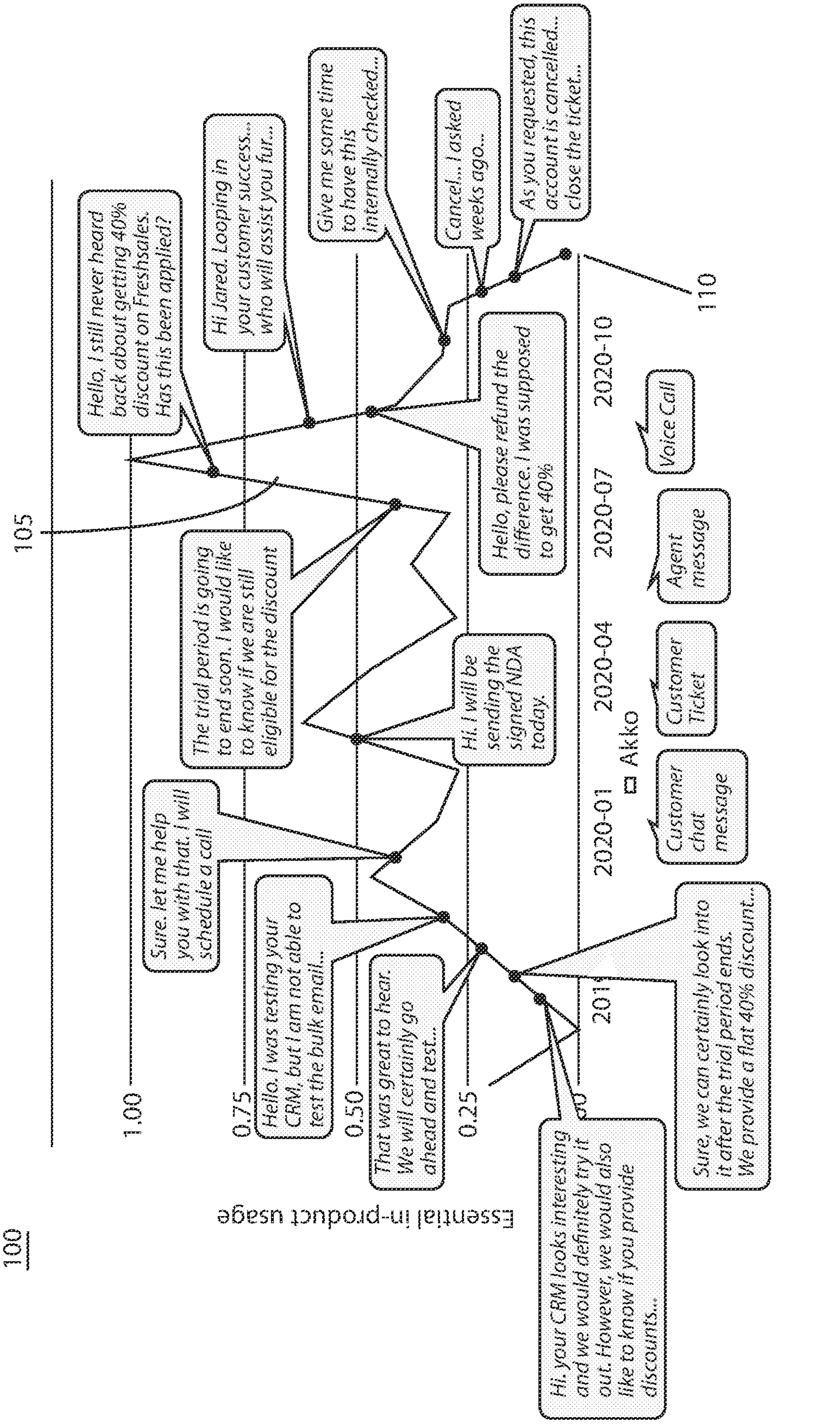
FIG. 1 is a chart illustrating a customer churning example, according to an embodiment of the present invention.

FIG. 1 is a chart 100 illustrating a customer churning example, according to an embodiment of the present invention. It can be seen from chart 100 that the customer expressed his or her displeasure through various platforms, eventually leading to the customer not renewing his or her subscription. More specifically, chart 100 shows a trendline 105 depicting Freshsales® product usage rate through different dates until the customer churned (see 110). This trend is merged with ticket data from Freshdesk® to get context from the issues raised by the customer, which happen just before the customer churned. Freshchat® conversations and voice calls are also merged in this example. This combination of Freshsales® usage rate, Freshdesk® tickets, Freshchat® messages and voice calls help in building a more accurate churn prediction model and predict churn as soon as the tickets with negative sentiments come in.

Figure 2:
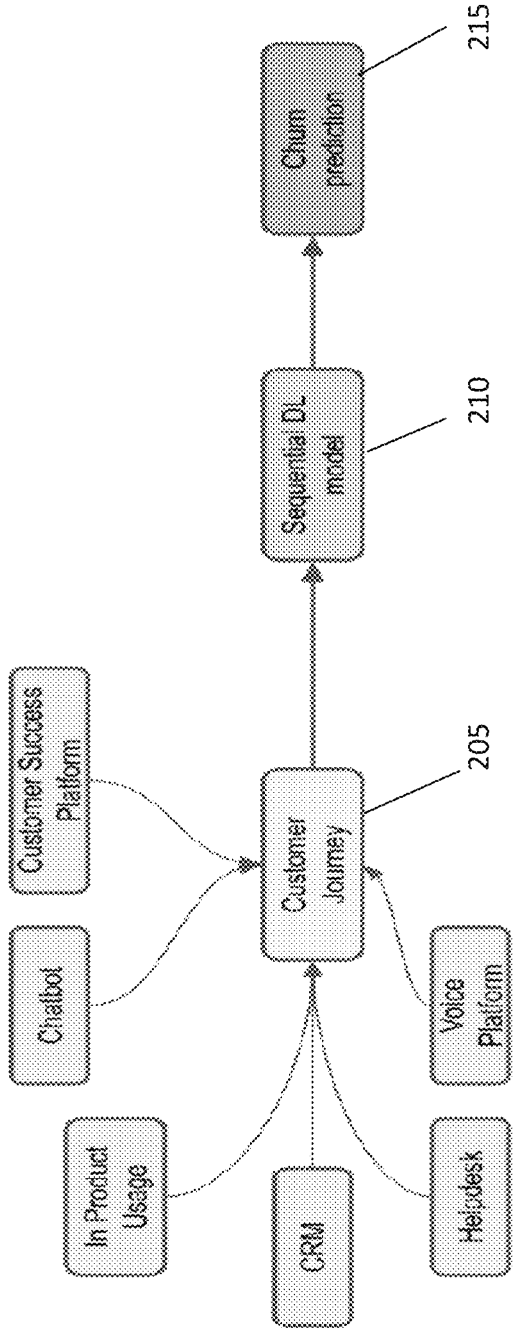
FIG. 2 is a flow diagram illustrating a system for predicting churn, according to an embodiment of the present invention.

FIG. 2 is a flow diagram illustrating a system 200 for predicting churn, according to an embodiment of the present invention. In this embodiment, a customer journey module 205 may collect data from a customer success platform, chatbot platform, in product usage platform, customer relationship management (CRM) platform, helpdesk platform, and voice platform. For purposes of explanation, holistic journeys are built for customers of CRM products. More specifically, the customer journey is built by consuming events such as product usage actions from the CRM platform, web events, emails, support tickets from the helpdesk platform, chat sessions from the chatbot platform, voice calls from our calling platform, calendar events, custom events, and third party enrichment data for customer attributes. Next, sequential DL model 210 may create relationships between events in a chronological manner allowing them to capture the temporal dependencies present in the data. DL is a type of ML that involves training artificial neural networks to recognize patterns and make predictions. With DL, neural networks are composed of many layers of interconnected nodes, called neurons, which allow the network to learn and extract features from raw data. DL involves training algorithms to recognize and classify patterns in large datasets by using multiple layers of non-linear processing units or artificial neurons. These features are used to make predictions or decisions about new data that the network has not seen before. Its success is largely attributed to its ability to learn from large amounts of data and to automatically discover meaningful representations of the data without the need for explicit feature engineering or domain expertise.

Finally, churn prediction module 215 may correlate the sequences of events to the churn event and identify whether a particular customer is going to churn or not based on the patterns learnt to differentiate between "churn" and "non-churn" customer journeys.

To build a customer sequence, the counts of all customer activities is calculated as a weekly vector, and all the weekly vectors are arranged as a sequence of 24 weeks (~6 months). Then, the sequences are passed through a LSTM architecture to predict whether the customer is going to churn. Every churned account may have weekly sequence vectors for each weekend date before the churn event.

Figure 3:
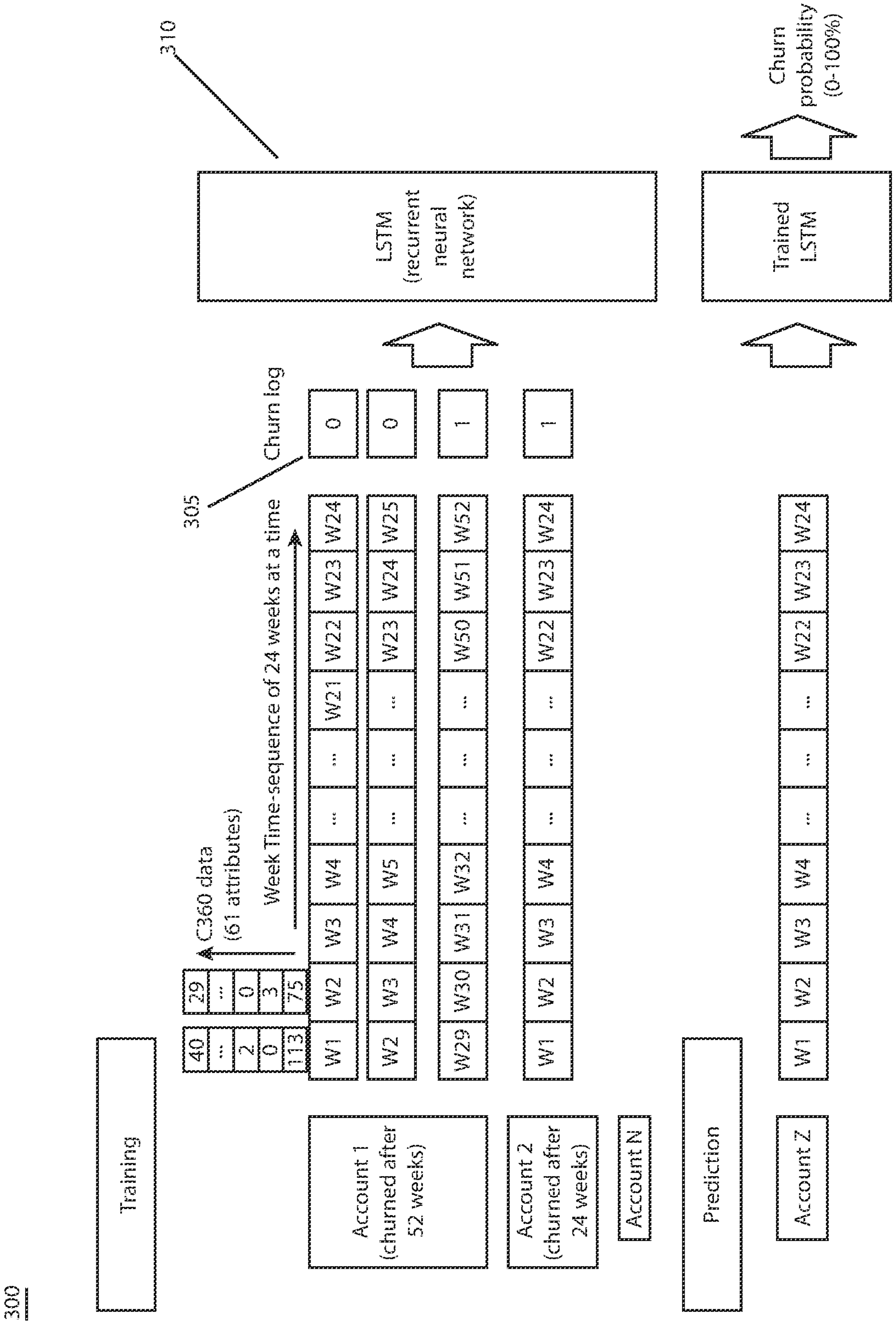
FIG. 3 is a system architecture illustrating a customer churn ML model architecture, according to an embodiment of the present invention.

FIG. 3 is a system architecture illustrating a customer churn ML model architecture 300, according to an embodiment of the present invention. Architecture 300 represents a classification problem and includes a churn flag 305, which contains 0s or 1s. Churn flag 305 are used to train recurrent neural network (or Long Short-Term Memory (LSTM)) 310.

LSTM network is a type of artificial neural network architecture that is commonly used in the field of deep learning. LSTMs addresses the limitations of traditional neural networks when it comes to handling sequential data, such as speech, text, and video. LSTMs use a special type of recurrent neural network (RNN) that remembers information for a long time and selectively forgets information that is no longer relevant. The key difference between an LSTM and a traditional RNN is the addition of memory cells and gating mechanisms. The memory cells allow the network to selectively store and access information over long periods of time, while the gating mechanisms control the flow of information into and out of the memory cells. LSTMs may be used for a wide range of applications, including natural language processing (NLP), speech recognition, and image captioning. LSTM may be effective in modeling complex temporal dependencies and handling vanishing and exploding gradient problems that can occur in traditional RNNs.

Initially, training of the model is performed. With training, the model learns the patterns that lead to churn. For example, historic data is fed from various platform in which the historic data represents events that have led to churn. In this example, there are N number of accounts, each of which have data over several weeks. For example, Account 1 has 52 weeks of data prior to the customer churning, and Account 2 has 24 weeks of data prior to the customer churning. When a customer churns, the churn flag is listed as 1, and all data associated with the churn event is fed into the model.

For a customer journey, weekly vectors are created. These weekly vectors comprise of:

1. Aggregated in-product counts, ticket data related to the product and chat sessions from the chatbot platform;
2. Bidirectional Encoded Representations from Transformers (BERT) for text data such as email, chat sessions from the chatbot platform and transcribed voice calls from the calling platform. A pretrained BERT model is finetuned separately on text data to generate embeddings; and
3. Calendar events, custom events, and third party enrichment data for customer attributes.

Sequences are created for each week by combining the last 12 weekly vectors ending in that week. These sequences implicitly represent customer behavior over a period of 12 weeks. Sequences are then fed into an LSTM, which processes each timestep chronologically and correlates them to the end event of the customer journey (churn or not). This way, the model learns patterns relating to both churn and non-churn customer behaviors. Learning sequentially also helps the model to understand patterns at each week of the customer journey and hence will be able to identify churn as early as possible.

Now when the model is learned, i.e., the model has received all of the patterns for each account, there is a new account, which may be an existing account of a user of a product. The pattern of usage for the new account is fed into the model, and the model is able to give a score between 0 and 100, which indicates that there is a probability of churning. For example, a pattern matching is performed between the patterns in the existing Account Z and the previously fed patterns of Accounts 1 . . . . N.

Figure 4:
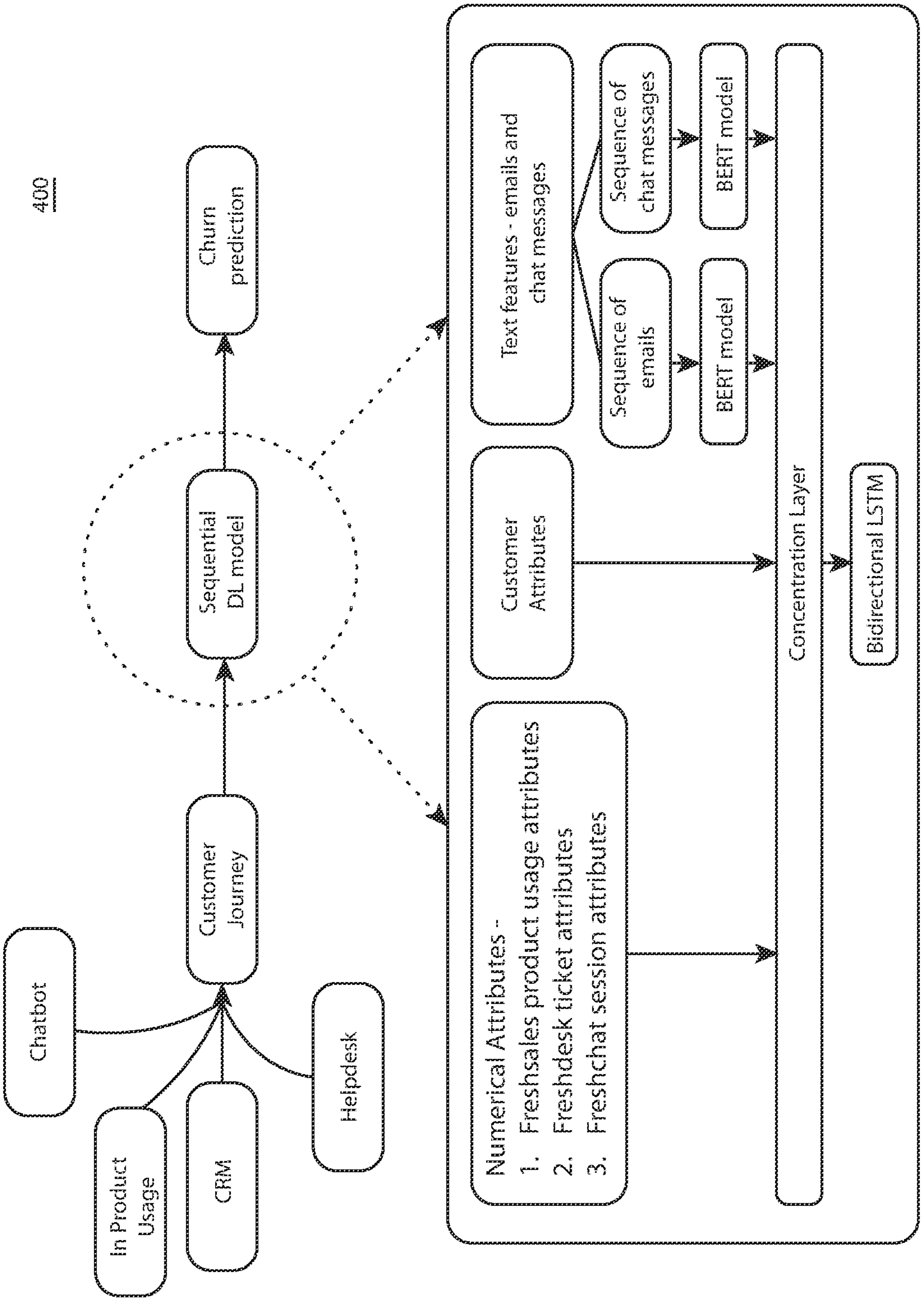
FIG. 4 is a diagram illustrating a system for predicting churn, according to an embodiment of the present invention.

FIG. 4 is a diagram illustrating a system 400 for predicting churn, according to an embodiment of the present invention. In sequential DL model 205, system 400 may stack numerical attributes 405 one after the other. In this example, numerical attributes 405 includes product usage attributes, ticket attributes, session attributes, and so forth. Customer attributes 410 may include country, city, employee size, customer revenue size and industry.

For some of the text features 415, which includes emails and chat messages, ML models only understands numbers 0s and 1s. For this reason, textual data is transformed into numerical sequence. For example, BERT™ model may help convert the text data into numerical sequences.

Numerical attributes 405, customer attributes 410 and text features 415, for each week (see FIG. 3), is appended side by side on concatenation layer 420. In short, all weekly data is aggregated and appended side by side. This is called a horizontal concatenation. In a vertical concatenation, for each week, all vertical data (i.e., CRM usages or product usages) is added. This way, the horizontal and vertical concatenation is entered in as a matrix that goes into the ML model.

Bidirectional LSTM 425 is the ML model, which learns the model through the horizontal and vertical concatenation. Simply put, Bidirectional LSTM 425 learns the correlation between the data (i.e., customer interaction) and outcome (i.e., customer churn based on customer interaction).

Figure 5:
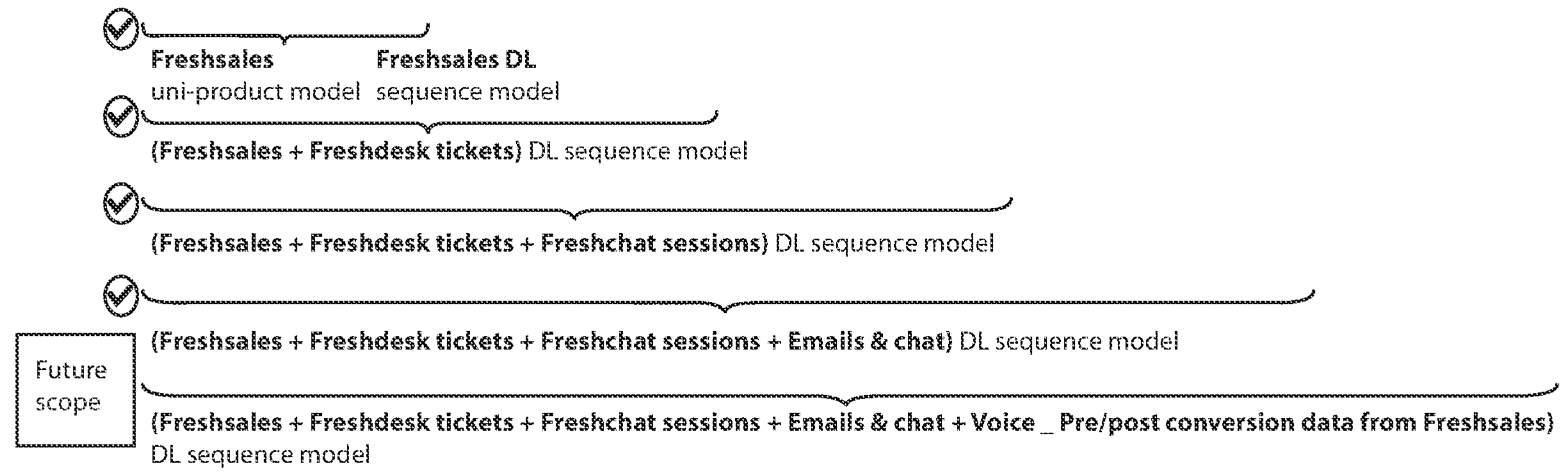
FIG. 5 is a chart illustrating evaluation and performance metrics, according to an embodiment of the present invention.

FIG. 5 is a chart 500 illustrating evaluation and performance metrics, according to an embodiment of the present invention. In this embodiment, for all accounts in the test set, the uni-product churn model without the sequential model architecture has an accuracy of 68% while with it, even without data from other products, it jumps to 73%. Now by combining signals from other products (i.e., Freshdesk® tickets, Freshchat® sessions, emails, and chat messages) it goes up to 78%. This supports the idea of building a sequential churn model by combining signals from different products. It can be seen that for accounts which have been in the system for more than 15 months, the accuracy jumps to 85.4%.

Figure 6:
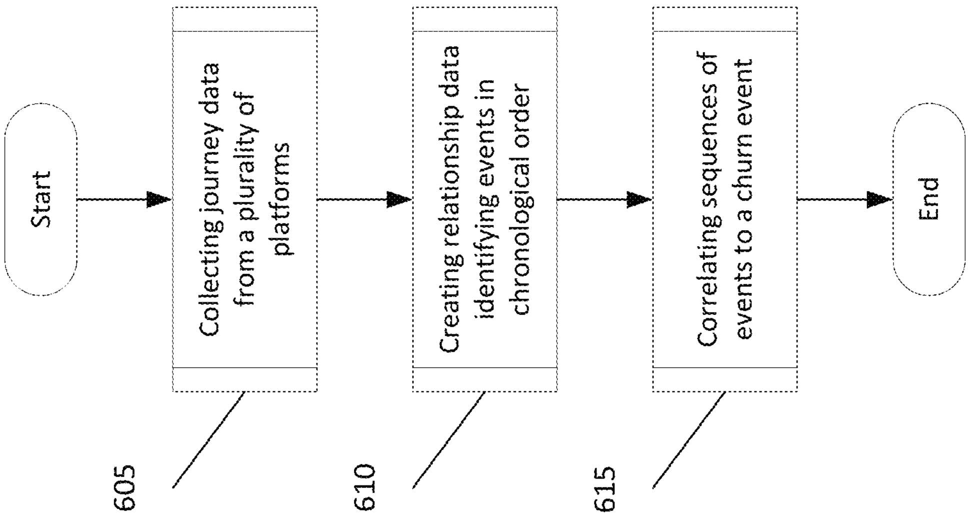
FIG. 6 is a flow diagram illustrating a method for predicting churn, according to an embodiment of the present invention.

FIG. 6 is a flow diagram illustrating a method 600 for predicting churn, according to an embodiment of the present invention. In this embodiment, method 600 includes collecting, by a journey module, data from a plurality of platforms to build a journey defined by one or more events at 605. At 610, method 600 includes creating, by a sequential DL model, relationship data identifying between events in a chronological order, capturing temporal dependencies present in the data. At 615, method 600 includes correlating, by a churn prediction module, sequences of events to a churn event, and identifying when the churn event is going to occur based on pattern learnt to differentiate between "churn" and "non-churn" journeys.

Figure 7:
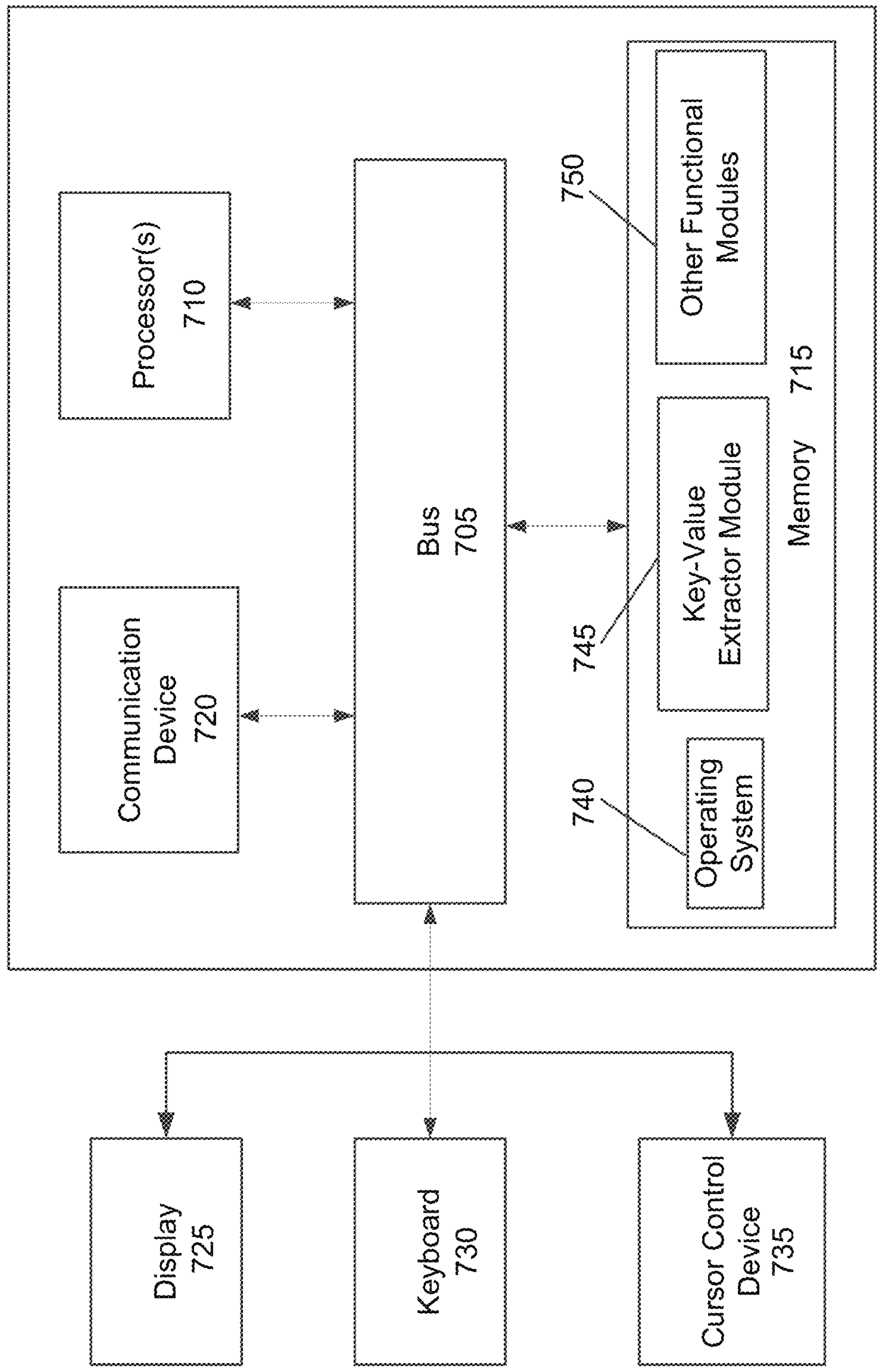
FIG. 7 is an architectural diagram illustrating a computing system configured to predict customer churn from multi-product data using sequential DL modeling, according to an embodiment of the present invention.

FIG. 7 is an architectural diagram illustrating a computing system 700 configured to predict customer churn from multi-product data using sequential DL modeling, according to an embodiment of the present invention. In some embodiments, computing system 700 may be one or more of the computing systems depicted and/or described herein. Computing system 700 includes a bus 705 or other communication mechanism for communicating information, and processor(s) 710 coupled to bus 705 for processing information. Processor(s) 710 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 710 may also have multiple processing cores, and at least some of the cores may be configured to perform specific functions. Multi-parallel processing may be used in some embodiments. In certain embodiments, at least one of processor(s) 710 may be a neuromorphic circuit that includes processing elements that mimic biological neurons. In some embodiments, neuromorphic circuits may not require the typical components of a Von Neumann computing architecture.

Computing system 700 further includes a memory 715 for storing information and instructions to be executed by processor(s) 710. Memory 715 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 710 and may include volatile media, non-volatile media, or both. The media may also be removable, non-removable, or both.

Additionally, computing system 700 includes a communication device 720, such as a transceiver, to provide access to a communications network via a wireless and/or wired connection. In some embodiments, communication device 720 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 720 may include one or more antennas that are singular, arrayed, phased, switched, beamforming, beamsteering, a combination thereof, and or any other antenna configuration without deviating from the scope of the invention.

Processor(s) 710 are further coupled via bus 705 to a display 725, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 725 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 730 and a cursor control device 735, such as a computer mouse, a touchpad, etc., are further coupled to bus 705 to enable a user to interface with computing system. However, in certain embodiments, a physical keyboard and mouse may not be present, and the user may interact with the device solely through display 725 and/or a touchpad (not shown). Any type and combination of input devices may be used as a matter of design choice. In certain embodiments, no physical input device and/or display is present. For instance, the user may interact with computing system 700 remotely via another computing system in communication therewith, or computing system 700 may operate autonomously.

Memory 715 stores software modules that provide functionality when executed by processor(s) 710. The modules include an operating system 540 for computing system 700. The modules further include a churn prediction module 545 that is configured to perform all or part of the processes described herein or derivatives thereof. Computing system 700 may include one or more additional functional modules 750 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 6 may be performed by a computer program, encoding instructions for the processor(s) to perform at least part of the process(es) described in FIG. 6, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 710 of computing system 700 of FIG. 7) to implement all or part of the process steps described in FIG. 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

Figure 8:
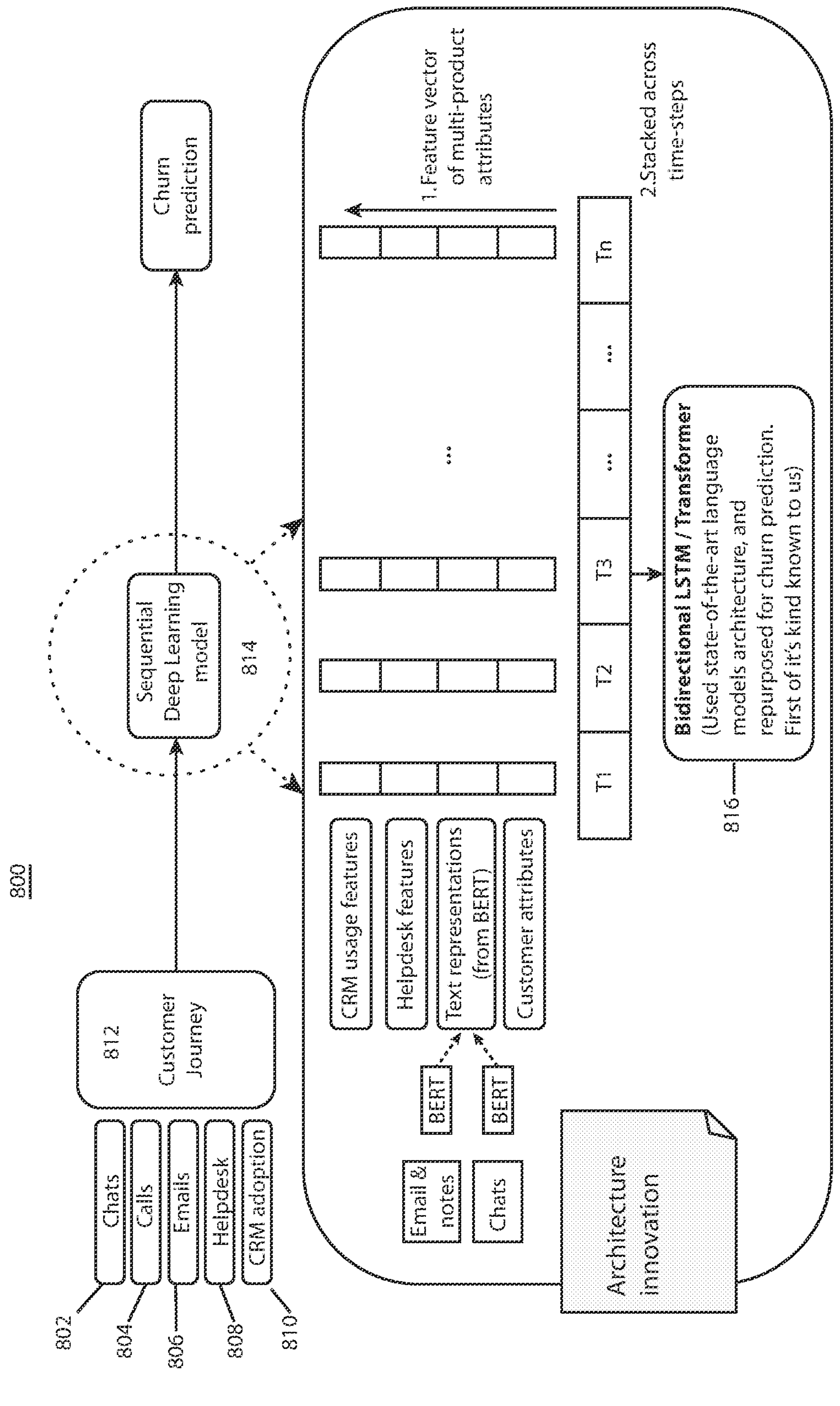
FIG. 8 is a diagram illustrating a churn prediction system, according to an embodiment of the present invention.

FIG. 8 is a diagram illustrating a churn prediction system 800, according to an embodiment of the present invention. In some embodiments, "customer journey" 812 is built by incorporating signals from chats 802, calls 804, emails 806, ticket data from helpdesk 808 and CRM adoption 810 features into weekly vectors, as explained above. The weekly vectors are then passed into LSTM model (sequential DL model) 814. All numerical features like aggregated in-product counts (CRM usage features), ticket data (helpdesk features) related to the product, chat sessions and customer attributes are ingested directly by the CRM while text features like emails, notes and chat messages are first passed through BERT. The pretrained BERT model is fine-tuned separately on text data to generate embeddings. The concatenated weekly feature vectors are processed chronologically by the bidirectional LSTM model/transformer 816 and learns patterns against the output flag (i.e., churn or not).

Figure 9:
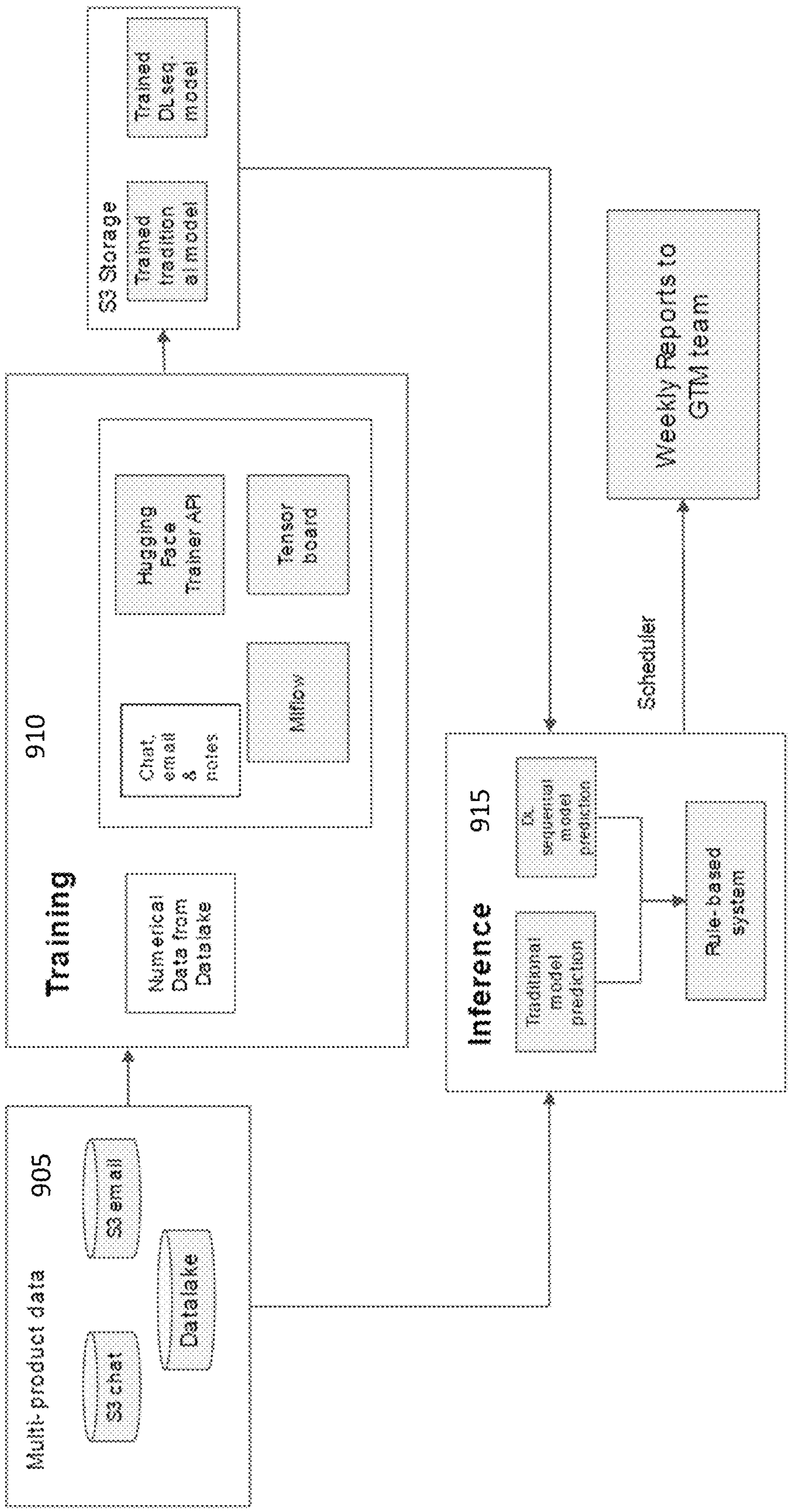
FIG. 9 is a system diagram illustrating a serving architecture for predicting customer churn, according to an embodiment of the present invention.

FIG. 9 is a system diagram illustrating a serving architecture 900 for predicting customer churn, according to an embodiment of the present invention. The data to customer journey weekly vectors are built by extracting data from a multi-product data database 905. This includes extracting from datalakes for numerical signals and AWS S3 buckets for chat, email and notes text. A training module 910 is configured to train text based BERT model first using a Trainer application programming interface (API) from HuggingFace™. The output embeddings from this model are concatenated with the numerical attributes, and are then passed into the LSTM (DL seq. model) for training. The experiments are logged on MLFlow. Both MLFlow and Tensor Board monitor and analyze different performance metrics during training. The trained DL sequential model is stored S3. Along with this, the trained traditional model for churn is also stored in S3. During inference, for the incoming accounts, the information is again extracted from S3 and datalake to build the weekly vectors. weekly vectors are then passed onto both the trained traditional and DL sequential model. In some embodiments, a customized rule based system with dynamic weighting is used to combine the predictions from both models. Inference process 915 is automated and scheduled to run at a particular time of week. The predictions are then sent as weekly reports to the GTM teams, which assists to double down on customers who are highly likely to churn, thereby reducing the churn rate.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for predicting churn from a multi-product data using sequential modeling, the computer-implemented method comprising:

training a recurrent neural network (RNN) to predict when a churn event is going to occur, wherein the training the RNN comprises collecting, by a journey module, historic data from a plurality of platforms to build a journey defined by one or more events, feeding the historic data from the plurality of platforms, wherein the historic data represents one or more events leading to a churn event, creating, by a sequential deep learning (DL) model, relationship data identifying between events in a chronological order, capturing temporal dependencies present in the historic data, wherein the creating the relationship data comprises stacking numerical data, transforming textual data into a numerical sequence of 0s and 1s, appending the stacked numerical data and the numerical sequence on a horizontal concatenation layer, adding usage data in a vertical concatenation layer, and entering horizontal concatenation and vertical concatenation as a matrix in the RNN, and correlating, by a churn prediction module, sequences of events from the RNN to a churn event; and predicting when the churn event is going to occur based on pattern learnt to differentiate between “churn” and “non-churn” journeys.

2. The computer-implemented method of claim 1, wherein the plurality of platforms comprise a customer success platform, a chatbot platform, in-product usage platform, a customer relationship management (CRM) platform, a helpdesk platform, and a voice platform.

3. The computer-implemented method of claim 1, wherein the one or more events comprise product usage actions from the CRM platform, web events, emails, support tickets from a helpdesk platform, chat sessions from a chatbot platform, voice calls from a calling platform, calendar events, custom events, and third party enrichment data for customer attributes.

4. The computer-implemented method of claim 1, further comprising:

identifying, by the sequential DL model, patterns using the relationship data to predict the churn.

5. The computer-implemented method of claim 1, further comprising:

calculating a plurality of counts for a plurality of customer activities as a weekly vector; and arranging a plurality of weekly vectors as a sequence of predefined weeks.

6. The computer-implemented method of claim 5, further comprising:

passing a plurality of sequences through a long short-term memory (LSTM) architecture to predict whether a customer is going to churn.

7. The computer-implemented method of claim 6, further comprising:

processing, by LSTM architecture, each timestep chronologically and correlating each timestep to an end event of the customer journey.

8. A system configured to predict churn from a multi-product data using sequential modeling, the system comprising:

memory comprising a set of instructions; and at least one processor, wherein the set of instructions are configured to cause the at least one processor to execute training a recurrent neural network (RNN) to predict when a churn event is going to occur, wherein the training the RNN comprises collecting, by a journey module, historic data from a plurality of platforms to build a journey defined by one or more events, feeding the historic data from the plurality of platforms, wherein the historic data represents one or more events leading to a churn event, creating, by a sequential deep learning (DL) model, relationship data identifying between events in a chronological order, capturing temporal dependencies present in the historic data, wherein the creating the relationship data comprises stacking numerical data, transforming textual data into a numerical sequence of 0s and 1s, appending the stacked numerical data and the numerical sequence on a horizontal concatenation layer, adding usage data in a vertical concatenation layer, and entering horizontal concatenation and vertical concatenation as a matrix in the RNN, and correlating, by a churn prediction module, sequences of events from the RNN to a churn event; and predicting when the churn event is going to occur based on pattern learnt to differentiate between “churn” and “non-churn” journeys.

9. The system of claim 8, wherein the plurality of platforms comprise a customer success platform, a chatbot platform, in-product usage platform, a customer relationship management (CRM) platform, a helpdesk platform, and a voice platform.

10. The system of claim 8, wherein the one or more events comprise product usage actions from the CRM platform, web events, emails, support tickets from a helpdesk platform, chat sessions from a chatbot platform, voice calls from a calling platform, calendar events, custom events, and third party enrichment data for customer attributes.

11. The system of claim 8, the set of instructions are configured to cause the at least one processor to execute:

identifying, by the sequential DL model, patterns using the relationship data to predict the churn.

12. The system of claim 8, the set of instructions are configured to cause the at least one processor to execute:

calculating a plurality of counts for a plurality of customer activities as a weekly vector; and arranging a plurality of weekly vectors as a sequence of predefined weeks.

13. The system of claim 12, the set of instructions are configured to cause the at least one processor to execute:

passing a plurality of sequences through a long short-term memory (LSTM) architecture to predict whether a customer is going to churn.

14. The system of claim 13, the set of instructions are configured to cause the at least one processor to execute:

processing, by LSTM architecture, each timestep chronologically and correlating each timestep to an end event of the customer journey.

15. A non-transitory computer-readable medium comprising a computer program that predicts churn from a multi-product data using sequential modeling, the computer program is configured to cause at least one processor to execute:

training a recurrent neural network (RNN) to predict when a churn event is going to occur, wherein the training the RNN comprises collecting, by a journey module, historic data from a plurality of platforms to build a journey defined by one or more events, feeding the historic data from the plurality of platforms, wherein the historic data represents one or more events leading to a churn event, creating, by a sequential deep learning (DL) model, relationship data identifying between events in a chronological order, capturing temporal dependencies present in the historic data, wherein the creating the relationship data comprises stacking numerical data, transforming textual data into a numerical sequence of 0s and 1s, appending the stacked numerical data and the numerical sequence on a horizontal concatenation layer, adding usage data in a vertical concatenation layer, and entering horizontal concatenation and vertical concatenation as a matrix in the RNN, and correlating, by a churn prediction module, sequences of events from the RNN to a churn event, and predicting when the churn event is going to occur based on pattern learnt to differentiate between "churn" and "non-churn" journeys.

16. The non-transitory computer-readable of claim 15, wherein the plurality of platforms comprise a customer success platform, a chatbot platform, in-product usage platform, a customer relationship management (CRM) platform, a helpdesk platform, and a voice platform.

17. The non-transitory computer-readable of claim 15, wherein the one or more events comprise product usage actions from the CRM platform, web events, emails, support tickets from a helpdesk platform, chat sessions from a chatbot platform, voice calls from a calling platform, calendar events, custom events, and third party enrichment data for customer attributes.

18. The non-transitory computer-readable of claim 15, wherein the computer program is further configured to cause the at least one processor to execute:

identifying, by the sequential DL model, patterns using the relationship data to predict the churn.

19. The non-transitory computer-readable of claim 8, wherein the computer program is further configured to cause the at least one processor to execute:

calculating a plurality of counts for a plurality of customer activities as a weekly vector; and arranging a plurality of weekly vectors as a sequence of predefined weeks.

20. The non-transitory computer-readable of claim 19, wherein the computer program is further configured to cause the at least one processor to execute:

passing a plurality of sequences through a long short-term memory (LSTM) architecture to predict whether a customer is going to churn; and processing, by LSTM architecture, each timestep chronologically and correlating each timestep to an end event of the customer journey.

* * * * *